United States Patent
Johnson

(10) Patent No.: US 7,170,995 B2
(45) Date of Patent: Jan. 30, 2007

(54) AUTOMATIC DIALING DEVICE, A SYSTEM, AND A METHOD FOR AUTOMATICALLY DIALING A TELEPHONE NUMBER AND/OR PLACING AN ORDER

(76) Inventor: David Johnson, 406 E. Lake Ave., Round Lake Beach, IL (US) 60073

( * ) Notice: Subject to any disclaimer, the term of this patent is extended or adjusted under 35 U.S.C. 154(b) by 469 days.

(21) Appl. No.: 10/223,816

(22) Filed: Aug. 19, 2002

(65) Prior Publication Data

US 2004/0032948 A1    Feb. 19, 2004

(51) Int. Cl.
*H04M 1/00* (2006.01)
*H04M 3/00* (2006.01)

(52) U.S. Cl. .................... 379/444; 379/357.03
(58) Field of Classification Search ............... 379/444, 379/355.5, 354, 357.3, 357.4, 368
See application file for complete search history.

(56) References Cited

U.S. PATENT DOCUMENTS

| | | | |
|---|---|---|---|
| 3,341,666 A | 9/1967 | Wallace, Jr. | |
| 3,600,522 A | 8/1971 | Benson | |
| 4,126,768 A | 11/1978 | Grenzow | |
| 4,682,357 A * | 7/1987 | Irino ................. | 379/357.04 |
| 4,763,355 A | 8/1988 | Cox | |
| 4,882,750 A | 11/1989 | Henderson et al. | |
| 4,941,172 A | 7/1990 | Winebaum et al. | |
| 4,980,910 A | 12/1990 | Oba et al. | |
| 4,995,077 A | 2/1991 | Malinowski | |
| 5,181,744 A * | 1/1993 | Betheil ................ | 283/56 |
| 5,241,590 A | 8/1993 | Deakins et al. | |
| 5,343,519 A * | 8/1994 | Feldman ............... | 379/357.03 |
| 5,357,566 A | 10/1994 | Dowling, Jr. et al. | |
| 5,377,263 A | 12/1994 | Bazemore et al. | |
| 5,452,352 A | 9/1995 | Talton | |
| 5,454,350 A | 10/1995 | Betheil | |
| 5,455,857 A * | 10/1995 | McGuire .............. | 379/357.03 |
| 5,528,681 A | 6/1996 | Iwai et al. | |
| 5,539,819 A | 7/1996 | Sonoyama et al. | |
| 5,583,919 A | 12/1996 | Talvard et al. | |
| 5,644,633 A | 7/1997 | Kaufeld et al. | |
| 5,671,271 A | 9/1997 | Henderson et al. | |
| 5,717,740 A | 2/1998 | Penning et al. | |
| 5,764,742 A | 6/1998 | Howard et al. | |
| 5,825,871 A * | 10/1998 | Mark .................... | 379/357.03 |
| 5,825,872 A * | 10/1998 | Mashinsky ............ | 379/357.03 |
| 5,963,637 A | 10/1999 | Arzoumanian | |
| 6,028,926 A | 2/2000 | Henderson et al. | |
| 6,144,732 A * | 11/2000 | Jauregui et al. ........... | 379/368 |
| 6,289,098 B1 * | 9/2001 | Wan-Lung ............ | 379/357.03 |
| 6,327,365 B1 * | 12/2001 | Kiger, II ............... | 379/357.03 |
| 6,498,847 B1 * | 12/2002 | Henderson et al. ..... | 379/355.01 |

* cited by examiner

*Primary Examiner*—William J. Deane, Jr.
(74) *Attorney, Agent, or Firm*—Patents + TMS, P.C.

(57) ABSTRACT

An automatic dialing device, system, and method for automatically dialing telephone numbers, placing orders and making announcements are provided. A user of the device places the device near the receiver of a telephone and presses a button on the device. By pressing the button, the user activates a circuit board in the device, and a tone necessary to dial a telephone number or otherwise relay an electronic code is generated. The generated tone is recognized by the telephone receiver, and the telephone number or code is transmitted. The code transmitted may be directed to a business, a person, or the like.

20 Claims, 5 Drawing Sheets

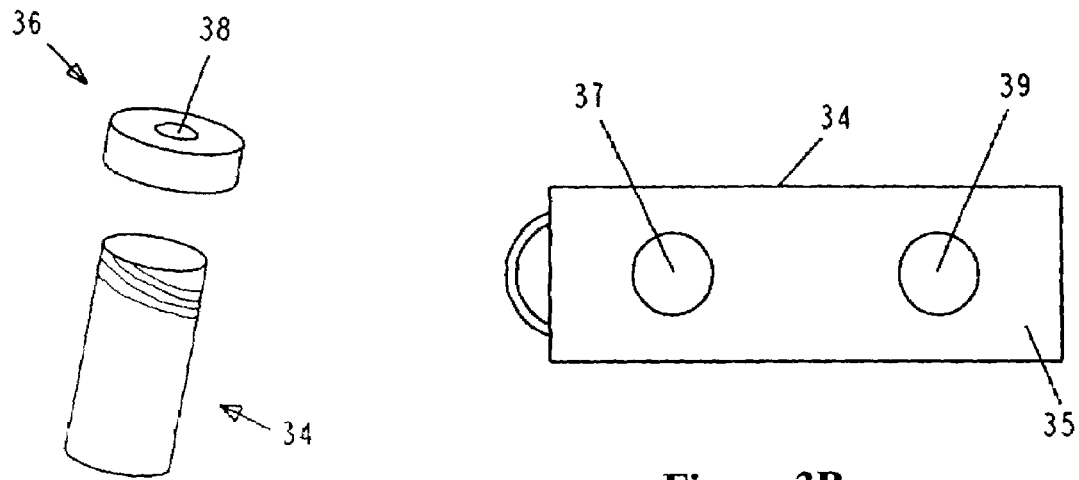
Figure 3A
Figure 3B
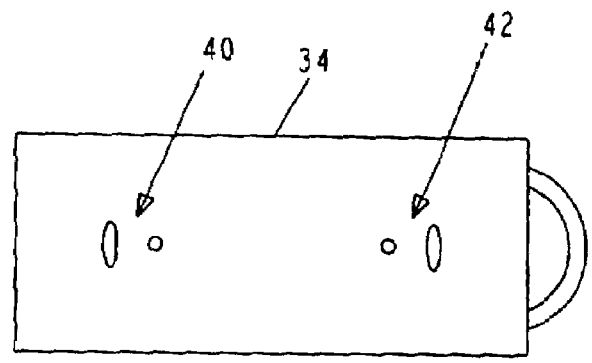
Figure 3C
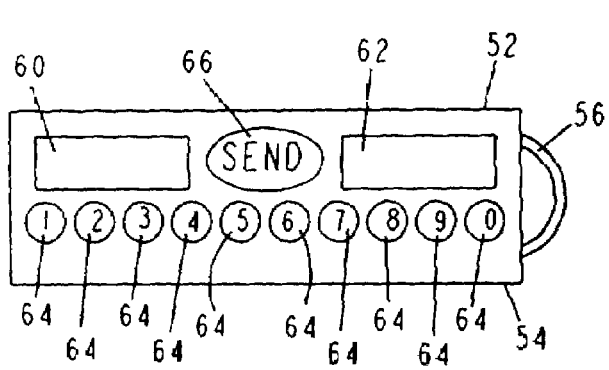
Figure 4

AUTOMATIC DIALING DEVICE, A SYSTEM, AND A METHOD FOR AUTOMATICALLY DIALING A TELEPHONE NUMBER AND/OR PLACING AN ORDER

BACKGROUND OF THE INVENTION

The present invention provides an automatic dialing device, a system, and a method for automatically dialing telephone numbers and/or placing orders. More specifically, the device has a microprocessor programmable to automatically dial a telephone number and/or provide information. The system and the method of the present invention provide for programming the device for automatic payment of a bill, ordering of a prescription refill, and the like.

Methods for ordering a prescription, ordering a pizza, or paying a bill are generally known. Generally, a person may place an order or pay a bill in person or over the telephone. For example, a person may travel to a pharmacy, or the like to order a prescription or the like. The person may then wait until the order is prepared and may then receive the order. Further, a person may go directly to the store or other location that processes bills and may pay a bill in person. The process involved in obtaining a prescription or paying a bill in person is time consuming and often inconvenient.

Alternatively, the person may use a telephone to contact a pharmacy, or a restaurant, or the like, place the order over the telephone, and then arrange to pick up the order or have the order delivered. The person may also pay a bill over the telephone by calling the appropriate number, providing personal information for verification, providing account information and finally providing authorization to pay a bill.

In fact, whether placing an order in person or over the phone, placing the order is tedious and time consuming. A device, system and method for automatically placing the orders alleviates the time and/or effort to place the orders in person or by telephone.

Automatic telephone number dialing mechanisms are generally known. For example, U.S. Pat. No. 5,357,566 to *Dowling Jr.* et al. describes a telephone number dialing mechanism including a micro-controller, a battery, and a sound-generating transducer. In use, the micro-controller stores a telephone number in its memory. The micro-controller is activated by touching a touch sensor. After the micro-controller is activated, a dialing mechanism generates a plurality of DTMF tones necessary to dial the stored telephone number. However, the dialing mechanisms taught by *Dowling Jr.* et al. include devices having a single telephone number programmed therein. The single telephone number is associated with a specific source. Only the specific source may be contacted with the dialing device.

A need, therefore, exists for an automatic dialing device, a system, and a method for using the device wherein various telephone numbers with or without corresponding codes may be automatically dialed and/or submitted. The device, the system and the method provide for automatic and/or direct ordering or re-ordering of, for example, a prescription order, or refill or other similar applications.

SUMMARY OF THE INVENTION

The present invention provides an automatic dialing device, a system, and a method for automatically dialing telephone numbers and placing orders. More specifically, the device has a microprocessor programmable to automatically dial a telephone number and relate a tone or electronic code that may rely an order. The system and the method of the present invention provide for programming the device for automatic ordering of a prescription refill, paying a bill, and the like.

To this end, in an embodiment of the present invention, an automatic dialing device is provided. The automatic dialing device has a housing, a circuit board in the housing and a button on the housing wherein the button electrically contacts the circuit board. The housing has walls defining an interior. The circuit board is disposed in the interior of the housing and stores a pre-determined code for producing a tone representative of a telephone number. The button electrically contacts the circuit board to activate the circuit board to produce the tone.

In an embodiment, the automatic dialing device has a hole associated with the housing for passing of the tone from the housing.

In an embodiment, the automatic dialing device has a top cover attached to a bottom cover wherein the top cover and the bottom cover form the housing defining the interior of the housing.

In an embodiment, the automatic dialing device has indicia on the housing associated with the telephone number.

In another embodiment of the present invention, a method for automatically transmitting a code is provided. The method comprises the steps of: providing a housing having a processor; programming the processor with a plurality of digits representing a code; placing the housing next to a telephone receiver; pressing a first button associated with the housing wherein the button activates the processor; generating a tone necessary to dial a telephone number; pressing a second button associated with the housing wherein the second button activates the processor; and generating a tone necessary to transmit a code.

In an embodiment, the method has the further step of displaying indicia on the housing.

In an embodiment, the method has the further step of displaying information associated with the code on the housing.

In an embodiment, the method has the further step of providing a plurality of buttons associated with the housing wherein each of the plurality of buttons electronically activates the processor.

In an embodiment, the method has the further step of programming the processor with a plurality of codes wherein each one of the plurality of codes corresponds to each one of a plurality of buttons, respectively.

In an embodiment, the code is a telephone number.

In an embodiment, the method has the further step of transmitting the tone necessary to transmit the code for placing an order, such as a prescription and/or reordering of any other item and/or service.

In an embodiment, the method has the further step of transmitting the tone necessary to transmit the code for operating a door.

In an embodiment, the method has the further step of transmitting the tone necessary to transmit the code for paying a bill.

In another embodiment of the present invention, a system for automatically dialing a telephone number to place an order is provided. The system has a dialing device having a processor, a telephone receiver receiving and transmitting a pre-determined code, and an outside source receiving the code. The processor stores a predetermined code, interprets the pre-determined code, and produces a tone necessary to dial the telephone number.

In another embodiment, the system further has a memory associated with the processor.

In another embodiment, the system further has a speaker associated with the dialing device.

In another embodiment, the system further has a display window associated with the dialing device.

Another advantage of the present invention is to provide an automatic dialing device, a system, and a method for automatically dialing telephone numbers wherein a prescription refill may be automatically ordered and/or reordering of any other item or service.

Further, an advantage of the present invention is to provide an automatic dialing device, a system, and a method for automatically dialing telephone numbers wherein a bill may be automatically paid.

Still further, an advantage of the present invention is to provide an automatic dialing device, a system, and a method for automatically dialing telephone numbers wherein a customer may be provided with access to a business.

Another advantage of the present invention is to provide an automatic dialing device, a system, and a method for automatically dialing telephone numbers wherein the dialing device may be pre-programmed to provide automatic dialing of a telephone number.

Yet another advantage of the present invention is to provide an automatic dialing device, a system, and a method for automatically transmitting a code wherein a lock may be operated.

Further, an advantage of the present invention is to provide an automatic dialing device, a system, and a method for automatically transmitting a code wherein a door may be operated.

Additional features and advantages of the present invention are described in, and will be apparent from, the detailed description of the presently preferred embodiments and from the drawings.

BRIEF DESCRIPTION OF THE DRAWINGS

FIG. 3A generally illustrates a perspective view of a medicine bottle with a dialing chip in an embodiment of the present invention.

FIG. 3B generally illustrates a front view of a stick with a dialing chip in an embodiment of the present invention.

FIG. 3C generally illustrates a back view of a stick with a dialing chip in an embodiment of the present invention.

FIG. 4 generally illustrates a top view of a dialing chip in an embodiment of the present invention.

DETAILED DESCRIPTION OF THE PRESENTLY PREFERRED EMBODIMENTS

The present invention provides an automatic dialing device, a system, and a method for automatically dialing telephone numbers and/or placing orders and/or paying bills and the like. The automatic dialing device may be associated with a key tag chain, pen, prescription bottle caps, calling cards, business cards, credit cards, pill bottle caps, any container having a cap, bracelets, letter openers, other promotional items, and the like.

Figure 1A:
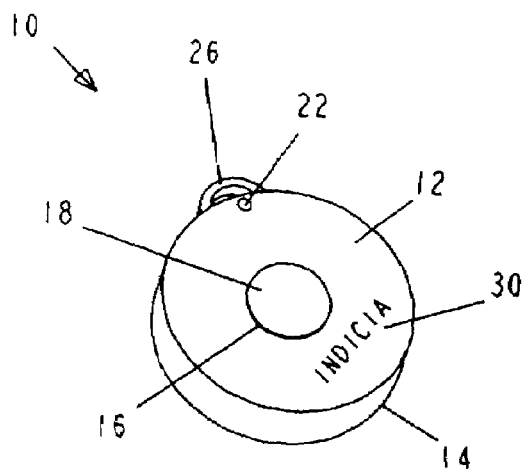
FIG. 1A generally illustrates a perspective view of a dialing chip in an embodiment of the present invention.

Referring now to the drawings wherein like numerals refer to like parts, FIG. 1A generally illustrates a dialing chip 10 having a top 12 and a bottom 14. The dialing chip 10 may have a hole 16 for receiving a button 18. The dialing chip 10 may have a second hole 22 for attachment of a key chain and/or the like. The second hole 22 may extend through the top 12 of the dialing chip 10 and through the bottom 14 of the dialing chip 10. Further, the dialing chip 10 may be associated with a strap 26 to be used to carry the dialing chip 10 or for further attachment of a key chain or the like. Alternatively, the button 18 may be integrally formed with the dialing chip 10.

Figure 1B:
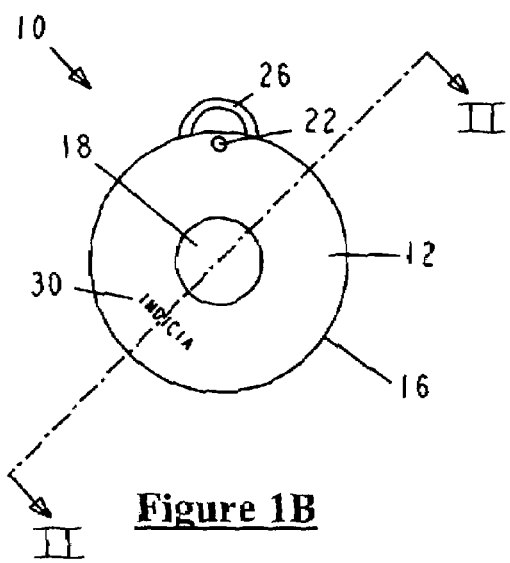
FIG. 1B generally illustrates a top view of a dialing chip in an embodiment of the present invention.

FIG. 1B generally illustrates a top view of the dialing chip 10. The dialing chip 10 may be circular in shape as illustrated. However, the dialing chip 10 may be manufactured in the shape of a sphere, a square, a rectangle, or the like. Further, the dialing chip 10 may have indicia 30 on the top 12 of the dialing chip 10. The indicia 30 may be associated with a telephone number and/or a code. Further, the indicia 30 may include advertisement, or a graphic, or a logo, or the like.

Figure 1C:
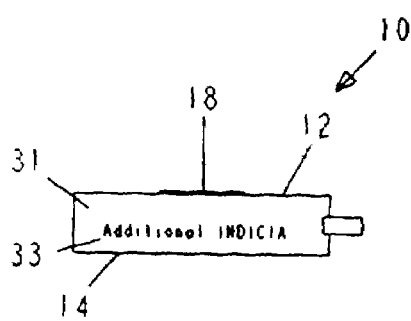
FIG. 1C generally illustrates a side view of a dialing chip in an embodiment of the present invention.

FIG. 1C generally illustrates a side view of the dialing chip 10. The dialing chip 10 may have a side 31 extending from the top 12 of the dialing chip 10 to the bottom 14 of the dialing chip 10. The side 31 may have additional indicia 33. The additional indicia 33 may be associated with the telephone number and/or the code. Further, the additional indicia 33 may include the advertisement, the graphic, the logo, the website address, or the like of the indicia 30. Alternatively, the additional indicia 33 may include information unrelated to the indicia 30.

Figure 1D:
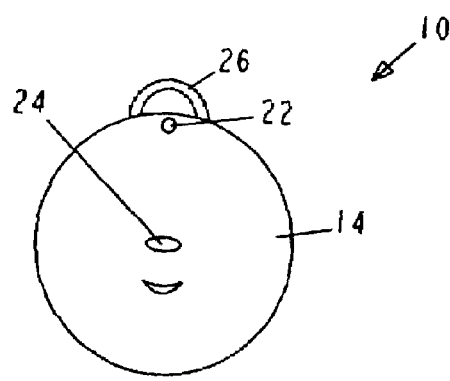
FIG. 1D generally illustrates a bottom view of a dialing chip in an embodiment of the present invention.

FIG. 1D generally illustrates a bottom view of the dialing chip 10. The bottom 14 of the dialing chip 10 may have a sound hole 24. As described below, sound, such as, for example, tones may be emitted from the dialing chip 10 through the sound hole 24. Further, the bottom 14 of the dialing chip 10 may be concave. The concave shape of the bottom 14 of the dialing chip 10 may direct the sound emitted from the dialing chip 10.

Figure 2A:
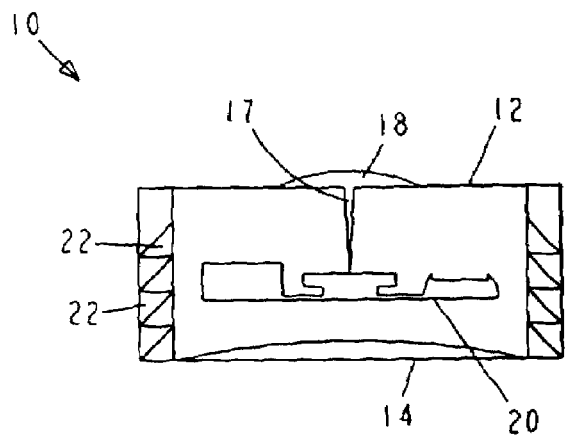
FIG. 2A generally illustrates a cross-sectional view taken along line III—III of FIG. 1B in an embodiment of the present invention.
Figure 2B:
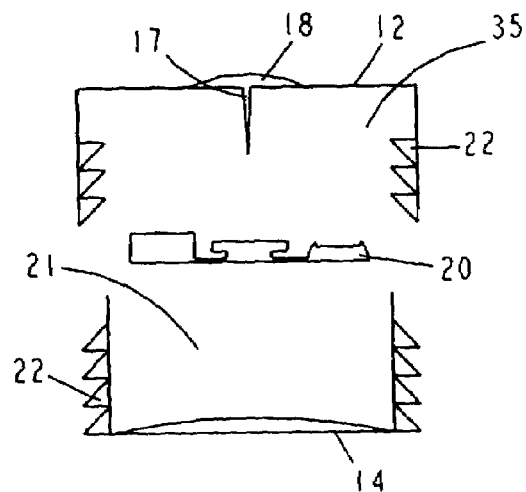
FIG. 2B generally illustrates an exploded cross-sectional view taken along line III—III of FIG. 1B in an embodiment of the present invention.

An interior 21 of the dialing chip 10 is illustrated in FIGS. 2A and 2B. The dialing chip 10 may have a circuit board 20 which may be located in the interior 21 of the dialing chip 10 between the top 12 and the bottom 14 of the dialing chip 10. A shaft 17 of the button 18 may electrically contact the circuit board 20 of the dialing chip 10. The top 12 and the bottom 14 of the dialing chip 10 may have tooth portions 22 that may mesh to allow the top 12 and the bottom 14 of the dialing chip 10 to be removably attached. Mechanisms for removably attaching the top 12 of the dialing device 10 to the bottom 14 of the dialing device 10 may also include adhesives, hook and loop fasteners, and the like. Alternatively, the top 12 and the bottom 14 may be integrally formed. Of course, any number of mechanisms for removably attaching the top 12 of the dialing device 10 to the bottom 14 of the dialing device 10 are well known and may be incorporated with out departing from the scope of the present invention.

A customer, such as, for example, a business owner, may use the dialing chip 10 for advertisement and/or to assist potential clients in contacting the business of the customer. The customer may place the indicia 30, such as, for example, advertisement for the customer's business on the top 12 of the dialing chip 10. Further, the dialing chip 10 may be programmed with a particular telephone number associated with the indicia 30, such as, for example, a telephone number associated with the customer's business. The customer may then distribute the dialing chip 10 to a user. Of course, the user may obtain and program the dialing device for personal use. For example, the user may obtain a dialing device and program the dialing device with any desired telephone number such as, a telephone number of a frequently called close friend, the telephone number to a local pharmacy, of the like.

The user may place the dialing chip 10 to a receiver of a telephone. After a dial tone from the receiver of the telephone is established, the user may push the button 18 on the dialing device 10. Pushing the button 18 may force the shaft 17 of the button 18 to make electrical contact with the circuit board 20 and may activate the circuit board 20.

By activating the dialing chip 10, tones necessary to dial the programmed telephone number associated with the indicia 30 may be generated. For example, the programed telephone number may be (800) 555-1234, and the indicia 30 may be advertisement for a local bakery. After the programmed telephone number is dialed, the user may automatically contact the local bakery via telephone.

In another embodiment of the present invention, the dialing chip 10 may be programmed with a telephone number and a particular code associated with the indicia 30. The code may be associated with a prescription refill order, or the like. The indicia 30 may be associated with a pharmacy, bank, or the like. After the dialing chip 10 is activated, the dialing chip 10 may generate tones necessary to dial the programmed telephone number associated with the indicia 30. After the user determines that the telephone number has been dialed, the button may be pushed a second time to transmit a code representing an order, such as, for example, refill prescription, pay bill, or the like.

Figure 7:
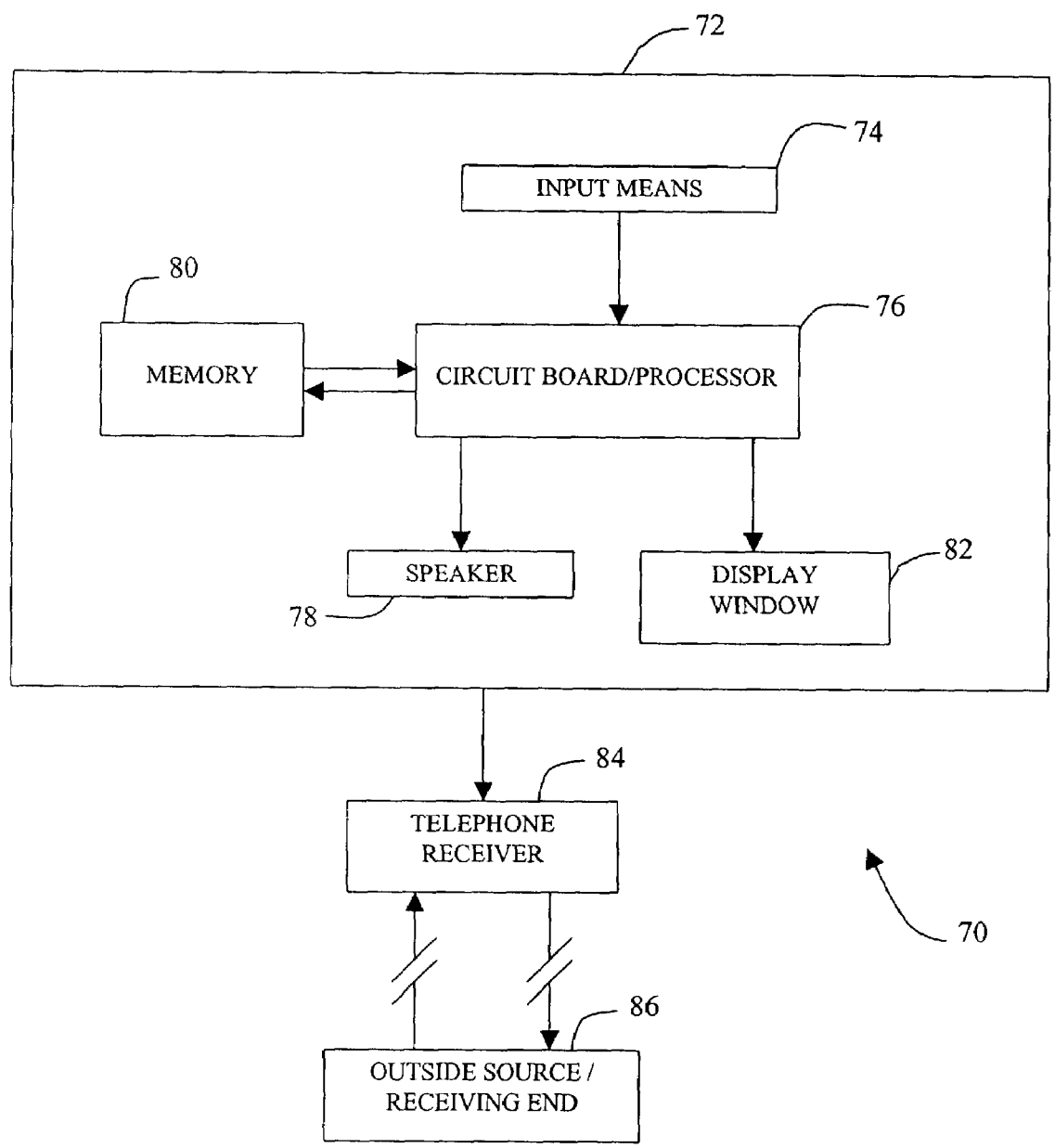
FIG. 7 generally illustrates a black box diagram of a system in an embodiment of the present invention.

Referring now to FIG. 7, a system 70 of the present invention is generally illustrated. A dialing device 72 may have an input means 74 having a circuit board or processor 76 and a speaker 78. The processor 76 has a memory 80. After the customer or user programs the dialing device 72, as discussed supra, the processor 76 may store the programmed information in the memory 80. After the circuit board or processor 76 is activated, as described supra, the processor 76 may obtain the information from the memory 80. The processor 76 may interpret the information received from the memory and may display the information in a display window 82 or may transmit the information to the speaker 78.

The processor 76 may transmit the information to the speaker 78 by obtaining the information from the memory 80, interpreting the information, and generating the tones necessary to dial a telephone number and/or transmit a code and/or tones to the speaker 78. The speaker 78 may broadcast the tones such that the tones are transmitted to a telephone receiver 84. After the telephone receiver 84 receives the information, an outside source 86, such as, for example, a pharmacy, a bank, or the like may be contacted via telephone. The outside source 86 may have a dedicated telephone line with a computer or other processor for receiving and/or interpreting and/or processing the information from the telephone receiver 84.

Referring now to FIG. 3A, in another embodiment, a medicine bottle 34 with a cap 36 is generally illustrated. The cap 36 may be incorporated with a dialing device having a circuit board (not shown). The cap 36 may have a button 38. After pushing the button 38, the button 38 may establish electrical contact with a circuit board to activate the circuit board. The circuit board may generate tones necessary to dial the telephone number of a pharmacy and/or order a refill of the contents of the medicine bottle 34, such as, for example, a refill of vitamins, a prescription medication, or the like. Further, the dialing device may be powered by a battery (not shown). After the battery loses its charge, the entire dialing device may be replaced.

Referring to FIG. 3B, in another embodiment, a front side 41 of a stick 42 is generally illustrated. The stick 42 may be incorporated with the dialing device having a circuit board (not shown). The dialing device may have more than one pre-programmed telephone number and/or code. The dialing device associated with the stick 42 may have a first button 37 and a second button 39. After pushing the first button 37, the first button 37 may establish electrical contact with the circuit board (not shown) and may activate the circuit board. Activation of the circuit board may generate tones necessary to dial a pre-programmed telephone number. The second button 38 may activate the circuit board wherein the circuit board may generate tones necessary to dial a different pre-programmed telephone number and/or code for transmitting an order. Alternately, the first button 37 and/or second button 39 may contact the circuit board one to activate the circuit board to generate the tones necessary to dial a telephone number. The first button 37 or the second button 39 may then contact the circuit board a second time to generate tones necessary to transmit a code.

Referring to FIG. 3C, the back side 43 of the stick 42 is generally illustrated. The stick 42 may further have a first sound hole 40 and a second sound hole 44. Tones generated by the circuit board may be emitted through the first sound hole 40 and/or the second sound hole 44. Alternatively, only one sound hole may be implemented with the device.

After the tones necessary to dial the corresponding programmed telephone number or to transmit an order are activated, a code may be transmitted. The code may be associated with the source of the stick 42. For example, the stick 42 may be from a pharmacy, and the code transmitted may be associated with a prescription refill. Of course a code for any transmitted order may be implemented by those skilled in the art. For example, the code may transmit the last date on which an order was placed; therefore, inadvertent ordering of prescriptions by the user may be avoided.

Referring now to FIG. 4, in an embodiment, a dialing device 50 is generally illustrated. The dialing device 50 may have a circuit board (not shown) located in the dialing device 50 between a wall 52 and an opposite wall 54 of the dialing device 50. The dialing device 50 may have a strap 56 for attachment of a key chain or the like. Further, the dialing device 50 may have a first window 62 and a corresponding second window 60. The first window 62 may display a pre-programmed telephone number. The second window 60 may display a logo, name, phrase, or the like associated with the pre-programmed telephone number. The displayed logo, name, phrase, or the like may be programmable electrical displays and/or pre-printed displays of information. The dialing device 50 may further have digit buttons 64 and a send button 66.

A customer may use the dialing device 50 by programming the circuit board with telephone numbers and/or codes. Each telephone number and/or code may correspond to a name incorporated by the customer. Each of the digit buttons 64 may be associated with one of the programmed telephone numbers and/or codes and name or logo corresponding to the telephone number.

For example, one of the digit buttons 64 may be associated with the telephone number (800) 555-1212 and the corresponding name "Information"; another of the digit buttons 64 may be associated with the telephone number 911 and the corresponding name "Emergency." Further, one of the digit buttons 64 may be associated with a code and the corresponding name "Pharmacy". The code associated with the corresponding name "Pharmacy" may be associated with a prescription.

The customer may distribute the dialing device 50 to a user wherein the user may automatically dial the telephone number or transmit the code associated with any of the digit buttons 64. Alternatively, the user may obtain the dialing device by direct purchase. The user may automatically dial the telephone number or transmit the code associated any of the digit buttons 64 by placing the dialing device 50 to a receiver of a telephone. After placing the dialing device 50 to the receiver of the telephone and establishing a dial tone, the user may push one of the digit buttons 64. After one of the digit buttons 64 is pushed, the circuit board (not shown) of the dialing device 50 may be activated. After the dialing device 50 is activated, the dialing device 50 may generate tones necessary to dial the corresponding programmed telephone number. After the telephone number is dialed, the user may push the same one of the digit buttons 64 or another one of the digit buttons 64 to transmit the corresponding code.

The dialing device 50, as illustrated in FIG. 4, is rectangular in shape. However, the dialing device 50 may be constructed in any shape, such as, for example, spherical, oblong, or the like.

Figure 5A:
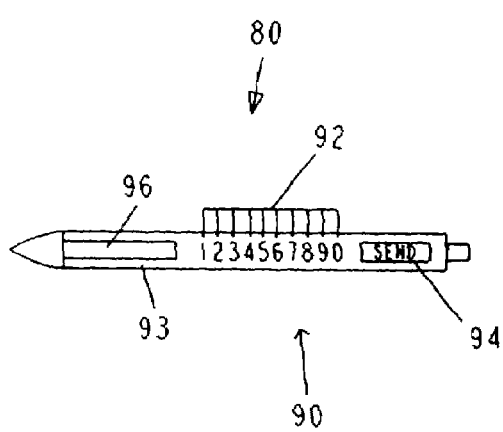
FIG. 5A generally illustrates a front view of a pen with a dialing chip in an embodiment of the present invention.
Figure 5B:
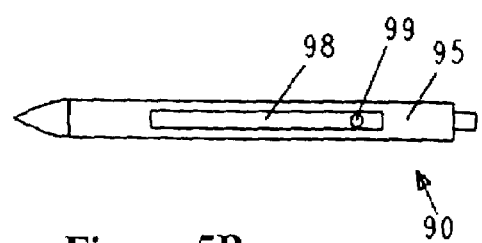
FIG. 5B generally illustrates a back view of a pen with a dialing chip in an embodiment of the present invention.

In an embodiment, the dialing device 80 may be incorporated into a pen 90 as generally illustrated in FIGS. 5A and 5B. FIG. 5A generally illustrates a front face 93 of the pen 90. The dialing device 80 of the pen 90 may have a circuit board (not shown). The pen 90 may have digit buttons 92 and a send button 94 on the front face 93. Further, the dialing device 80 may have a window 96 for telephone and/or name information on the front face 93.

FIG. 5B generally illustrates a back face 95 of the pen 90. Still further, the pen 90 may have a location 98 for advertisement, information, and/or other indicia on a back face 95 of the pen 90. The location 98 may have an indicia button 99. The indicia button 99 may be associated with the indicia on the back face 95 of the pen 90.

A customer may use the dialing device 80 by programming the circuit board with telephone numbers and/or codes. The telephone number and/or the code may correspond to a name. Each of the digit buttons 92 may be associated with one of the programmed telephone numbers and/or codes. Each of the digit buttons 92 may also be associated with a corresponding name.

Figure 6:
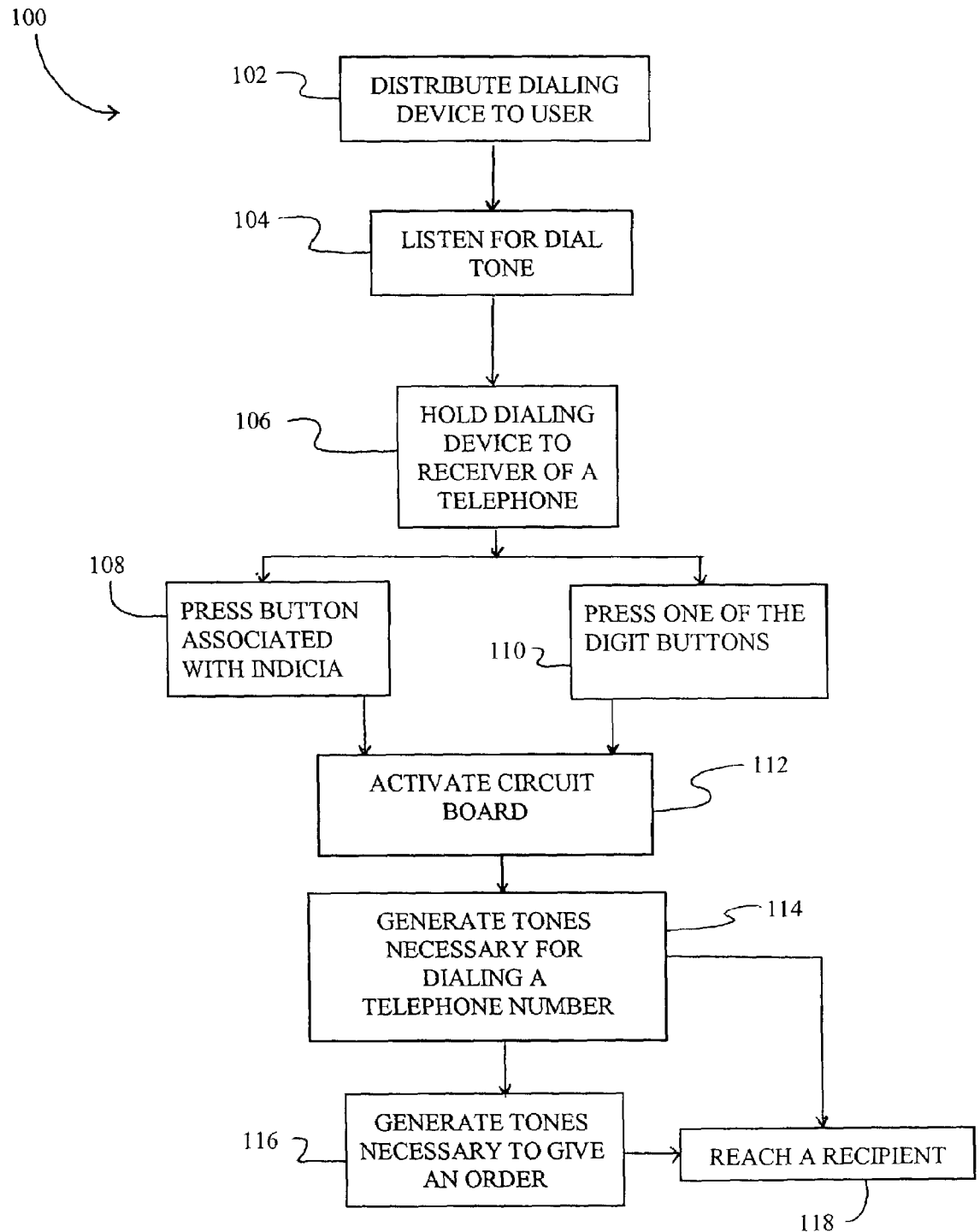
FIG. 6 generally illustrates a flowchart of a method for automatically transmitting a code in an embodiment of the present invention.

Referring to FIG. 6, a method 100 for using the dialing device 80 to automatically dial a telephone number, transmit a code, or the like is generally illustrated. A customer, such as, for example, "Phil's Pharmacy", may distribute the dialing device 80 to a user, such as, for example, a patient as shown at step 102. After a dial tone is established from a receiver of a telephone as shown at step 104, the user may hold the dialing device 80 to the receiver of the telephone as shown at step 106. The user may push the indicia button 99 as shown at step 108. The indicia button 99 may be associated with the customer, i.e. "Phil's Pharmacy". The indicia button 99 may activate the circuit board as shown at step 112.

The circuit board may generate the necessary tones associated with the indicia to dial a pre-programmed telephone number as shown at step 114. For example, the pre-programmed telephone number may be associated with the indicia, for example, the telephone number for "Phil's Pharmacy". Alternatively, the user may push any one of the digit buttons 92 as shown at step 110. For example, one of the digit buttons 92 may be associated with a medical doctor of the user. One of the digit buttons 92, may activate the circuit board through electrical connection as shown at step 112. The circuit board may generate tones associated with one of the digit buttons 92 that are necessary to dial a corresponding telephone number, such as, for example, the telephone number to "Phil's Pharmacy", as shown at step 114.

After a recipient is reached, as shown at step 118, by generating tones to dial a telephone number, the tones necessary to give an order, such as, for example, refill a prescription, may be generated as shown at step 116. The order may be associated with the indicia or other information. After the recipient of the order is reached, as shown at step 118, the last step in the method for using the dialing device 80 has been completed.

Of course, any number of uses may be associated with the dialing device of the present invention, such as, for example, automatically dialing a telephone number, making an order, unlocking a door, or any other instruction. For example, the dialing device may be associated with, for example, the cap of a medicine bottle, a credit card, a key chain, or the like.

The tones necessary to transmit a corresponding code may provide any pre-programmed order, such as, for example, "re-order vitamins", "pay minimum balance", or "unlock door". A dialing device associated with a credit card may be pre-programmed with tones that may instruct that a predetermined amount of money is transferred from one account to another, or to "pay minimum balance". A dialing device associated with a key chain may be pre-programmed with tones that may provide a code for the locking or unlocking of a specific door, such as, for example, a car door, a garage door, or the like. Further, the dialing device associated with the cap of a medicine bottle may be pre-programmed with tones that may provide instructions to a drug store to "re-order vitamins" for a user.

It should be understood that various changes and modifications to the presently preferred embodiments described herein will be apparent to those skilled in the art. Such changes and modifications may be made without departing from the spirit and scope of the present invention and without diminishing its attendant advantages.

I claim:

1. An automatic dialing device for placing an order for a prescription medication with an outside source that supplies the prescription medication wherein an order number for the order of the prescription medication is assigned by the outside source wherein the order number is indicative of the prescription medication wherein a telephone number is assigned to the outside source for receiving a communication via a telephone receiver wherein the outside source receives the order for the prescription medication from the communication via the telephone receiver, the automatic dialing device comprising:

a container having a base and walls defining an interior wherein the walls of the container have a first end and a second end wherein the second end is located opposite to the first end and further wherein the second end of the walls is connected to the base of the container wherein the container has a length defined between the base and the first end of the walls of the container wherein the walls of the container have a first perimeter which is circular;

a housing having walls defining an interior wherein the housing has a length defined between a top side and a bottom side wherein the walls of the housing have a second perimeter which is circular wherein the bottom side of the housing receives the first end of the walls of the container wherein the housing encloses the interior of the container when the bottom side of the housing is attached to the first end of the walls of the container;

first indicia on the housing wherein the first indicia identifies the prescription medication and the outside source;

a speaker in the interior of the housing;

a circuit board in the interior of the housing wherein the circuit board is electrically connected to the speaker wherein the circuit board has a memory which stores the telephone number of the outside source and a code wherein the telephone number provides communication to the outside source wherein the code identifies the order number for the prescription medication wherein the memory of the circuit board stores a first tone representative of the telephone number and a second tone representative of the code wherein the first tone is a different tone than the second tone; and a switch in the interior of the housing wherein the switch is electrically connected to the circuit board wherein the circuit board is activated by the switch wherein the speaker broadcasts the first tone and the second tone wherein the first tone is necessary to dial the telephone number of the outside source and further wherein the second tone is necessary to transmit the order number for the order of the prescription medication from the speaker within the housing to the outside source.

2. The automatic dialing device of claim 1 further comprising:

second indicia on the housing wherein the second indicia identifies the order for the prescription medication.

3. The automatic dialing device of claim 1 further comprising:

a strap connected to the housing wherein the strap is attached to the walls of the housing.

4. The automatic dialing device of claim 1 further comprising:

a button on the top side of the housing wherein the button is attached to the switch wherein the button is depressed to activate the circuit board via the switch.

5. The automatic dialing device of claim 1 further comprising:

a hole in the housing wherein the first tone and the second tone are broadcast from the speaker within the interior of the housing via the hole.

6. The automatic dialing device of claim 1 wherein the outside source distributes the prescription medication.

7. A method for automatically transmitting a code for placing an order for a prescription medication from an outside source wherein a telephone number is assigned to the outside source for contacting the outside source via a telephone receiver, the method comprising the steps of:

providing a container having exterior walls defining an interior wherein the container has a first perimeter and a length defined between a first end and a second end of the container wherein an opening is formed within the exterior walls of the container at the first end of the container wherein the interior of the container is sized to store the prescription medication wherein the first perimeter has a shape;

providing a housing having exterior walls defining an interior of the housing wherein the exterior walls of the housing have a second perimeter and a length defined between a top surface and a bottom surface of the housing wherein the second perimeter of the housing has a shape which is the same shape as the shape of the first perimeter of the container wherein the housing has a speaker and a processor within the interior of the housing wherein the speaker is electrically connected to the processor wherein the processor is programmed with the telephone number of the outside source and a code wherein the code identifies the order for the prescription medication wherein the bottom surface of the housing receives the first end of the container wherein the housing encloses the opening of the container when the housing is attached to the first end of the container;

placing the housing at a location adjacent to the telephone receiver;

pressing a first button located on the top surface of the housing wherein the first button activates the processor;

broadcasting a first tone from the speaker to the telephone receiver by pressing the first button wherein the first tone is representative of the telephone number of the outside source wherein the first tone is received and processed by the telephone receiver via the speaker wherein the telephone receiver identifies the telephone number of the outside source via the first tone wherein the telephone receiver processes the telephone number to communicate with the outside source; and broadcasting a second tone from the speaker to the outside source via the telephone receiver wherein the second tone is a different tone than the first tone wherein the second tone is representative of the code wherein the second tone identifies the order of the prescription medication wherein the outside source receives the code from the telephone receiver via the second tone wherein the outside source identifies the order for the prescription medication from the code.

8. The method of claim 7 further comprising the step of:

pressing a second button located on the top surface of the housing wherein the second button terminates broadcasting of the first tone and the second tone.

9. The method of claim 7 further comprising the step of:

displaying indicia on the housing wherein the indicia identifies the prescription medication.

10. The method of claim 7 further comprising the step of:

displaying indicia on the housing wherein the indicia identifies the outside source and the telephone number of the outside source.

11. The method of claim 7 further comprising the step of:

placing the prescription medication within the interior of the container wherein the housing encloses the prescription medication within the interior of the container when the housing is attached to the first end of the container.

12. The method of claim 7 further comprising the step of:
processing the order for the prescription medication wherein the outside source receives the order for the prescription medication from the telephone receiver via the second tone broadcast from the speaker.

13. The method of claim 7 further comprising the step of:
attaching the bottom surface of the housing to the first end of the container wherein the prescription medication is located within the interior of the container.

14. A system for automatically dialing a telephone number of an outside source and for transmitting an order number for a prescription medication to the outside source from a telephone receiver via the telephone number of the outside source wherein the outside source supplies the prescription medication wherein the order number identifies an order for, the prescription medication from the outside source, the system comprising:

a medicine bottle having a container and a cap wherein the container of the medicine bottle has a base and walls defining an interior of the container wherein the walls have a first end and a second end wherein the second end is located opposite to the first end and further wherein the second end of the walls is connected to the base of the container wherein the container has a length defined between the base and the first end of the walls wherein the cap has walls defining an interior wherein the cap of the medicine bottle has an exterior surface defining an interior of the cap wherein the cap has a switch on the exterior of the cap wherein the cap receives the first end of the container wherein the medicine bottle is closed when the cap is attached to the first end of the container;

a processor in the interior of the cap wherein the processor stores a telephone number and a code indicative of the order number of the order for the prescription medication and further wherein the processor produces a first tone representative of the telephone number of the outside source and a second tone representative of the code of the order number and further wherein the switch is electrically connected to the processor wherein the first tone is different than the second tone; and a first speaker in the interior of the cap wherein the first speaker is electrically connected to the processor wherein the switch activates the processor wherein the first speaker broadcasts the first tone and the second tone from the cap of the medicine bottle to the telephone receiver wherein the telephone receiver receives the first tone and the second tone from the processor via the speaker wherein the telephone receiver identifies the telephone number of the outside source from the first tone wherein the telephone receiver dials the telephone number of the outside source wherein the outside source receives the second tone from the first speaker via the telephone receiver wherein the outside source determines the order number for the order of the prescription medication from the second code wherein the outside source identifies the order of the prescription medication from the order number received from the telephone receiver.

15. The system of claim 14 further comprising:
a second button on the exterior surface of the cap wherein the second button is electrically connected to the processor.

16. The system of claim 14 further comprising:
a second speaker within the interior of the cap wherein the second speaker is electrically connected to the processor.

17. The system of claim 14 further comprising:
indicia on the exterior surface of the container wherein the indicia identifies the outside source, the prescription medication, the order number for the order of the prescription medication or the telephone number of the outside source.

18. The system of claim 14 wherein the outside source distributes the prescription medication.

19. The system of claim 14 wherein the medicine bottle has a circular perimeter.

20. The system of claim 14 further comprising:
a hole formed in the exterior surface of the cap wherein the speaker broadcasts the first tone and the second tone via the hole in the exterior surface of the cap.

* * * * *